Patented Sept. 20, 1932

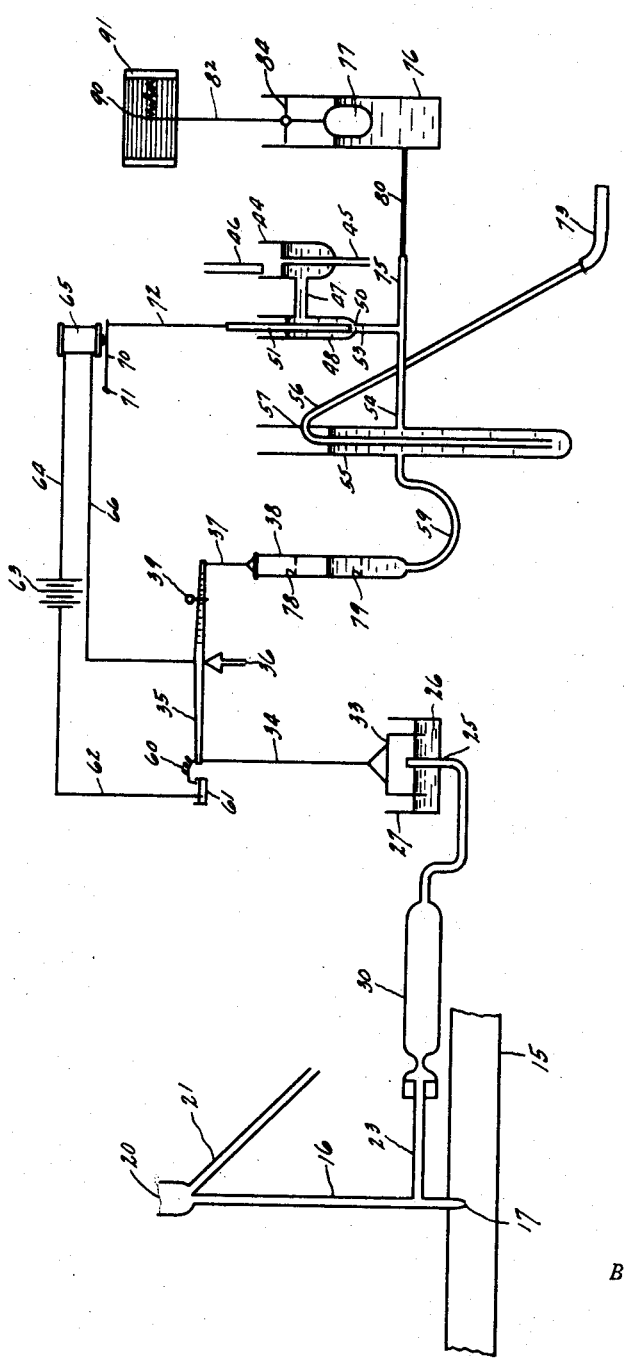

1,878,179

UNITED STATES PATENT OFFICE

FRANCIS G. RAWLING, OF CHILLICOTHE, OHIO, ASSIGNOR, BY MESNE ASSIGNMENTS, TO THE MEAD CORPORATION, OF DAYTON, OHIO, A CORPORATION OF OHIO

CONTROL MECHANISM

Application filed May 11, 1928. Serial No. 277,035.

This invention relates to gas control and analysis.

It is among the objects of this invention to provide a method of analyzing gaseous mixtures, which permits of continuous and accurate determination of the gaseous constituents with a minimum of labor without resorting to chemical analysis.

It is another object of this invention to provide apparatus for carrying out this method of gas analysis, which apparatus is simple and economical in construction, extremely sensitive in operation, and which is calibrated to read directly in analytical units.

Other objects and advantages of the invention will be apparent from the following description when taken in connection with the accompanying drawing and appended claims.

In the drawing, the single figure is a diagrammatic view of gas analysis apparatus constructed in accordance with this invention.

This invention contemplates the analysis of gaseous mixtures confined within a chamber or flowing through a flow passage. In accordance with the method of this invention, a sample of the gaseous mixture is withdrawn from the chamber or flow passage, and this sample of gaseous mixture is formed into a column of predetermined height in an atmosphere of one of the gaseous constituents and at the pressure of this atmosphere. The composition of the gaseous mixture is then indicated or determined by weighing the gaseous mixture and indicating the difference in weight of the column of gaseous mixture over the weight of a like column of the said one gaseous constituent. Thus, for example, where a mixture of air and chlorine is to be analyzed, a sample of the air and chlorine mixture is withdrawn and formed into a column of predetermined height open to atmosphere. The percentage of chlorine in the mixture is then determined by noting or indicating the excess in weight of the chlorine air mixture over the weight of a like column of air. This method also contemplates the continuous analysis and recording of such gaseous mixtures. In order to suitably magnify the slight pressure variations existent at the base of such columns of gaseous mixtures, the pressure variations are translated and magnified into weight variations. The weight variations are in turn translated and magnified into liquid level variations, which are recorded.

The present invention provides a method of and apparatus for gas analysis which is particularly adapted for use in connection with a chlorination tower for the chlorination of fibrous stock in the manufacture of paper pulp, as disclosed in the copending application of John Traquair and Francis G. Rawling, Serial No. 273,242, filed April 27, 1928. As applied to such chlorination apparatus, this invention is adapted to continuously analyze the mixture of air and chlorine passing off through the offtake pipe from the base of the chlorination tower, and to record this analysis for control purposes. While the analysis of air and chlorine is particularly described herein for purposes of illustration, it is to be understood that this method and the apparatus for carrying out this method are applicable generally to the analysis of mixtures of gases having different specific gravities.

Referring to the drawing, in which a preferred embodiment of apparatus for carrying out the method of this invention is illustrated, a flow passage or gas pipe is indicated at 15 through which a stream of gaseous mixture is flowing. This may be the offtake pipe from the chlorination tower as described in the above referred to copending application, through which a stream of air and chlorine is flowing under a pressure slightly in excess of atmospheric. An upright sampling tube 16 having an opening 17 of capillary size extends within the pipe 15 and serves to continuously withdraw a sample of the gaseous mixture. The capillary opening 17 is of such size that the sample of gaseous mixture formed within the tube 16 is at atmospheric pressure. Where the gaseous mixture flowing through the pipe 15, or confined within a chamber, is at a pressure less than atmospheric, a portion of the mixture is withdrawn by a pump and forced under slight pressure into an auxiliary main, into which the sampling tube 16 projects.

Where a mixture of air and chlorine is to be analyzed, the tube 16 is freely open to the atmosphere at its upper end as indicated at 20. The mixture of chlorine and air withdrawn forms a column within the tube 16 which is somewhat heavier than a like column of air, thereby creating a pressure at the base of the column which is equal to the excess weight of this column over a like column of air. An overflow pipe 21 is provided at the upper end of the tube 16 into which passes the excess chlorine and air mixture, and from which it is led to suitable recovery apparatus or to an exhauster to prevent the chlorine from escaping directly into the atmosphere. Adjacent the base of the tube 16 is a pressure tube or connection 23, which has an upturned end 25 opening above the level of liquid 26 confined within a container 27, and within a pressure bell 33, the lower end of which is immersed within the liquid 26. Any suitable liquid such as water or kerosene may be used. Where kerosene is used, it is preferable to free the gases which may pass through the pressure connection 23 from chlorine. For this purpose a soda lime tube 30 is positioned within the pressure connection. The level of liquid 26 is preferably positioned substantially at the level of the pressure tube 23, in which case the effective predetermined column is formed between the tubes 21 and 23. In any event, the effective column is formed between the level of the offtake tube 21 and the level of the liquid 26.

The pressure existent adjacent the base of the column of the gaseous mixture within the tube 16 is very slight. With an effective column of about two feet in height, a pressure of approximately .001 pounds per square inch above atmospheric is produced with pure chlorine gas, while even smaller pressures are produced for the same column with mixtures of air and chlorine. For accurate analysis, it is desirable that pressure variations of as little as .0001 pounds per square inch and even less be recorded. For this purpose, extremely sensitive control and recording apparatus is provided. As shown, the pressure bell 33 is suspended by a wire 34 from one arm of a balance beam 35 fulcrumed on a knife-edge support 36, this balance beam being similar to the balance beam of an analytical balance and preferably having agate planes and agate supports. The pressure bell 33 is preferably made of thin glass and is of considerable cross-section to provide for increased buoyant effect upon slight pressure variations. Suspended from the other arm of the balance beam 35 by a wire 37 is a counterpoise 38. A rider 39 is adapted to be adjusted over the graduated arm of the balance beam.

In order to further increase the sensitivity of the apparatus, means are provided for effecting a continuous oscillation of the balance beam in order to overcome the effect of inertia of the parts. For this purpose, the counterpoise 38 is preferably constructed of a glass tube to which liquid such as water is supplied and withdrawn in such a manner as to continuously change the effective weight of the counterpoise 38 to provide for a continuous oscillation of the balance beam. Liquid is continuously supplied to a fixed constant level tube 44 having an overflow pipe 45 by a pipe 46. The tube 44 is connected below the liquid level by a passage 47 with a tube 48. The lower end of the tube 48 is ground to provide a valve seat 50 on which a valve 51 is adapted to seat. The valve 51 may be formed from a glass rod having a ground end which is worked to a nice fit in the seat 50. The tube 48 is connected below valve seat 50 by glass tubes 53 and 54 to a tube 55 provided with a syphon discharge tube 56. The upper end or bend 57 of the syphon tube is preferably positioned at a lower level than the level of liquid within the constant level chamber 44 so that the syphon is self-starting when the apparatus is put into use. Control of the rate of discharge of liquid is effected by adjustment of the elevation of the lower end of the syphon tube 56, or by selection of a tube having a flow passage of predetermined size. The supply of liquid into the system through the valve seat 50 and tubes 53 and 54 is adapted to be at a rate in excess of the discharge rate. The tube 55 is in turn connected by flexible tubing 59 with the lower end of the liquid-containing counterpoise 38, a portion of the tubing 59 thus constituting a part of the counterpoise.

When the valve 51 is raised from the seat 50, water flows into the system including the counterpoise 38 faster than it discharges through the syphon tube 56. This causes a rising water level in the counterpoise 38 which eventually overbalances the weight of the parts on the other side of the fulcrum 36 including the pressure bell 33 so that the balance beam tilts to the right-hand side as shown in Fig. 1. Carried by the balance beam 35 is a movable contact 60 which upon tilting of the balance beam 35 to the right is withdrawn from a fixed contact such as a tungsten contact or mercury cup 61. A conductor dipping within the mercury within the cup 61 is connected by a lead 62 to one side of the battery 63, the other side of the battery being connected by lead 64 to one end of a coil of an electromagnet 65. The other end of the coil is connected by a lead 66 to the metal balance beam 35 which completes the electrical circuit. Cooperating with the electromagnet 65 is an armature 70 pivoted at 71. The outer end of the armature 70 is connected by wire 72 with the valve 51.

Consequently when the electrical circuit of the electromagnet 65 is broken at the contact 61, the pivoted armature 70 falls, permitting the valve 51 to drop upon its seat 50 to shut off the supply of water to the system. The outflow of water from the system through the syphon 56 then reduces the level of water within the counterpoise 38 until the effective weight of the counterpoise is less than the weight of the parts of the other side of the balance beam. The balance beam then tilts to the left to again close the contacts 60—61 which causes energization of the electromagnet 65 and attracts the armature 70 with consequent opening of the valve 51. The balance beam is thus kept in continuous oscillation during flow control.

The amplitude of oscillation controlled by the electrical contacts and supply valve is slight, whereby movement of the pressure bell is slight and is not sufficient to remove the lower end of the bell from the immersing liquid. The period of oscillation is controlled by the rates of supply and discharge of liquid, the size and proportion of the parts, the amplitude of swing, and other factors. Any suitable period may be used which serves to keep the balance beam moving to overcome inertia and sticking of the parts, very satisfactory results being secured with a period of 10 to 20 seconds. With a given set of parts of desired size, the oscillation may be controlled by adjustment of the elevation of the discharge end of the syphon tube, which tube should be quite long to prevent breaking of the syphon. This may be conveniently accomplished by providing a flexible piece of tubing 73 at the discharge end of the syphon tube, the end of the flexible tube being arranged for adjustment to suitable elevations. Lowering the discharge end of the syphon tube increases the rate of outflow through the syphon tube, and raising the discharge end decreases the rate of flow. An increased outflow will cause the water system including the counterpoise to fill more slowly with water but to empty more rapidly, which thereby provides a slower swinging movement of the balance beam during filling of the counterpoise and a faster swinging movement during discharge. Thus by adjustment of the end of the syphon tube, the oscillation of the balance beam in each direction is controlled. Preferably, the end of the syphon tube is set at the proper level such that the period of oscillation is divided into substantially equal periods of filling and emptying. The construction provides a water-control system which is fixed independently of the balance, and which may be of any capacity desired. The tops of all the tubes are preferably higher than the fixed overflow pipe 45 of the constant level tube 44, so that no overflow can occur except at this point.

Connected to the liquid system on the far side of the liquid supply valve 51 is a tube 75 leading to a float chamber 76 containing a float 77. As the counterpoise 38, the syphon tube 55, and float chamber 76 are interconnected, the water levels within the respective tubes tend to equalize. Due to the intermittent supply of liquid to the counterpoise 38 and consequent oscillation of the balance beam, the level of liquid within the counterpoise continuously fluctuates between an upper level 78 and a lower level 79. This produces a surge in the system which tends to produce a fluctuating level within the float chamber 76. In order to damp out this surge effect, the float chamber 76 is connected by a tube 80 having a materially restricted bore with the tube 75. The net result is that the level of liquid in the float chamber 76 remains substantially quiet, and this level represents the mean effective level of the fluctuating levels of the counterpoise 38. The stem 82 of the float 77 is movable in a suitable guide 84 and carries at its upper end a suitable indicating means such as a pen 90. Associated with the pen 90 is a chart 91 which may be continuously driven by suitable clock mechanism (not shown) in a well-known manner.

In operation, should the pressure existent at the base of the column within the sampling tube 16 increase, this increased pressure is communicated by the passage 23 to the pressure bell 33. The bell is partially supported by gas trapped beneath the bell, and partially by the balance beam. The increased pressure thereby increases the buoyant effect of the trapped gas and so reduces the effective weight of the bell, with the result that less water is required in the counterpoise 38 to balance the weight of the parts of the other side of the balance beam to maintain the parts in equilibrium. The increase in pressure of the gas in the bell raises it and also the arm of the balance beam from which the bell is suspended, thus breaking the electrical contacts 60—61 and closing the valve 51. The counterpoise becomes lighter owing to the action of the syphon until the parts are again in equilibrium, when the beam will continue to oscillate as before.

As a result, a lower set of fluctuating levels 78 and 79 is produced in the counterpoise 38, the mean effective level of which is lower than the previous mean effective level. The level of liquid within the float chamber 76 thus falls, and lowering of the float 77 operates through the stem 82 to lower the pen 90 with reference to the chart whereby the increased pressure is indicated. Conversely, when the pressure at the base of the column within the sampling tube falls below a predetermined pressure, the effective weight of the bell 33 is increased, and a higher set of fluctuating levels 78 and 79 is produced in the counterpoise 38. This gives a higher level in the float chamber 76 and rising movement of the float 77 raises the pen 90 with reference to the chart 91. Thus small pressure fluctuations are translated by the balance into weight variations, and the proportions and buoyancy of the bell and frictionless balance beam magnify the exceedingly small pressure fluctuations into appreciable weight differences. The liquid system in turn translates the weight differences into fluctuations in liquid level. The provision of a counterpoise tube 38 of small diameter provides for a considerable fluctuation in liquid level for a relatively small difference in weight. The float chamber 76 on the other hand can be of relatively large size and contain a float of sufficient buoyancy to actuate the stem and indicating pen carried thereby to give a positive and accurate indication of the pressure communicated to the bell 33.

The pressure existent at the base of the column of gaseous mixture within the sampling tube 16 will vary directly with the percentage of chlorine therein. For example, when a column of pure chlorine is confined within the tube 16, then a maximum pressure is produced which is communicated to the pressure bell 33 and through the weighing mechanism to the float chamber 76, which in turn indicates by the pen 90 upon the chart 91 an extreme low level. On the other hand, when a column of pure air is confined within the tube 16, then a zero pressure exists at the base of the column which results in the highest water level within the float chamber 76, and consequently the highest position of the indicating pen 90 upon the chart 91. Inasmuch as the specific gravities of air and chlorine are respectively known, then the specific gravities of various mixtures of these constituents may be readily calculated. And the particular chart may be calibrated to find a zero point as above indicated for pure air within the sampling tube, and another point for pure chlorine within the sampling tube, and the intermediate space of the chart calibrated for intermediate mixtures of air and chlorine. Consequently, the recording chart may be calibrated to read directly in percentages of chlorine in the gas mixture, or in other analytical units such as inches of chlorine, pounds per square inch, etc. Thus a method and apparatus are provided for graphically recording varying compositions of gas mixtures within a gas chamber or flowing through a flow passage. The zero point of the chart may be altered or adjusted by adjustment of the rider 39 on the balance beam, by altering the height of the contacts 60—61 with reference to the balance beam, or by altering the level of the liquid 26 within which the lower end of the pressure bell is immersed.

While the control apparatus has been described particularly in connection with the analysis of an air-chlorine mixture, it is to be understood that it is applicable generally to the analysis of gaseous mixtures in which the gaseous constituents have different specific gravities. Thus, for example, a mixture of air and sulphur dioxide, or a mixture of air and carbon dioxide, may be continuously analyzed in the manner above described. A mixture of air and a gas lighter than air such as hydrogen may also be analyzed, the balance system in this case indicating the reduced weight of the column over the weight of a like column of air. Where air is not one of the constituents of the gaseous mixture, the analysis may be carried out in an atmosphere of one of the constituents. Thus, in analyzing a mixture of sulphur dioxide and carbon dioxide, for example, the sampling tube and bell jar may be encased and the surrounding atmosphere filled with carbon dioxide, the gaseous mixture within the sampling tube and the bell jar being confined at the pressure of the carbon dioxide atmosphere. Analysis of mixtures of more than two gases may also be readily carried out by successive recorders, by passing the mixed gases through them in series and using absorbents for any one gas between the recorders.

For very accurate analysis, corrections may be made for temperature, pressure and humidity in a well-known manner. This is not ordinarily necessary for satisfactory analysis for the chlorine tower operation, as only slight errors are introduced.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. The method of continuously analyzing a flowing gaseous mixture, which comprises continuously withdrawing a portion of the gaseous mixture, passing said portion so withdrawn through a predetermined column confined in an atmosphere of one of said gaseous constituents at the pressure of said atmosphere, continuously balancing the difference in weight of the column over the weight of a like column of said one gaseous constituent, continuously magnifying the balanced weight differences, and making a continuous indication of said weight differences in analytical units.

2. Gas-analysis apparatus of the character described, comprising a gas holder containing a gaseous mixture, means for withdrawing a sample of said gaseous mixture and for forming a gaseous column of said mixture of predetermined height, said means being confined in an atmosphere of one of said gaseous constituents and being freely open to said atmosphere, means for balancing the difference in weight of said column over the weight of a like column of said one gaseous constituent, means for magnifying the balanced weight difference thus obtained, and means for indicating the magnified weight difference.

3. Gas-analysis apparatus of the character described, comprising a gas holder containing a gaseous mixture, means for withdrawing a sample of said gaseous mixture and for forming a gaseous column of said mixture of predetermined height, said means being confined in an atmosphere of one of said gaseous constituents and being freely open to said atmosphere, means responsive to pressure adjacent the base of said column for translating pressure variations into weight differences, means for magnifying the weight differences thus obtained and means for indicating said magnified weight differences in analytical units.

4. Gas-analysis apparatus of the character described, comprising a gas holder containing a gaseous mixture, means for withdrawing a sample of said gaseous mixture and for forming a gaseous column of said mixture of predetremined height, said means being confined in an atmosphere of one of said gaseous constituents and being freely open to said atmosphere, means responsive to pressure adjacent the base of said column for translating pressure variations into weight differences, a liquid container, means for translating said weight differences into liquid level variations in said liquid container, and means responsive to liquid level in said liquid container for indicating in analytical units.

5. Gas-analysis apparatus of the character described, comprising a gas passage containing a gaseous mixture, means for continuously withdrawing a sample of said gaseous mixture and for continuously forming a gaseous column of said mixture of predetermined height, said means being confined in an atmosphere of one of said gaseous constituents and being freely open to said atmosphere, means for weighing said gaseous column continuously formed, indicating mechanism actuated by said weighing means, and a chart associated with said indicating mechanism calibrated to read directly in desired analytical units.

6. Gas-analysis apparatus of the character described, comprising a gas holder containing a gaseous mixture, means for withdrawing a sample of said gaseous mixture and for forming a gaseous column of said mixture of predetermined height, said means being confined in an atmosphere of one of said gaseous constituents and being freely open to said atmosphere, means responsive to pressure adjacent the base of said column for translating pressure variations into weight differences, a liquid container, means for translating said weight differences into liquid level variations in said liquid container, a float in said liquid container, a pen carried thereby; and a chart associated with said pen in recording relationship, said chart being calibrated to read directly in desired analytical units.

7. Continuous gas-analysis apparatus of the character described, comprising a gaseous passage containing a gaseous mixture, a tube having a capillary opening inserted within said gas passage for continuously withdrawing a portion of the gaseous mixture and forming the same into a column of predetermined height, said tube being confined within an atmosphere of one of said gaseous constituents and being freely open to said atmosphere, a pressure passage leading off from said tube, weighing means associated with said pressure passage for weighing said column, and means for indicating the difference in weight of said column over the weight of a like column of said one gaseous constituent.

8. In gas analysis apparatus of the character described, a gas holder, an upstanding member having means for withdrawing a portion of the gas within said holder and forming the same into a column within said member, said member being open to atmosphere, means for withdrawing gas from said member to prevent the gas from escaping into the atmosphere, and a pressure passage leading off from said member below the atmospheric opening and below said gas withdrawing means.

9. In gas analysis apparatus of the character described, a gas passage, an upstanding tube, means for continuously withdrawing a portion of the gas within said passage and continuously passing the gas in a predetermined column upwardly through said tube, said tube being open to atmosphere adjacent its upper end, means below said atmospheric opening for continuously withdrawing gas from said tube to prevent the gas from escaping into the atmosphere, and a pressure passage leading off from said tube below the atmospheric opening and below said gas withdrawing means.

10. In gas analysis apparatus of the character described, a gas holder, means for withdrawing a portion of said gaseous mixture and for forming a gaseous column of said mixture of predetermined height, a pressure passage leading off from said column, a member responsive to the pressure in said passage, and a filtering means within said passage between said column and said pressure responsive member.

11. In gas sampling apparatus of the character described, a gas passage containing a gaseous medium, and means for continuously withdrawing a sample of the gas from said gas passage and forming the same into a column of predetermined height comprising a tube communicating with said gas passage through a capillary opening of such size as to make the pressure within the tube substantially independent of that in the gas passage.

12. In gas sampling apparatus of the character described, the combination of a gas passage containing a gaseous mixture, means for continuously withdrawing a portion of the gas and forming the same into a column of predetermined height comprising a tube communicating with said gas passage through a capillary opening, said tube being confined within an atmosphere of one of the constituents of said gaseous mixture and being freely open to the atmosphere, said capillary opening being of such size as to make the pressure within the tube substantially independent of that in the gas passage.

In testimony whereof I hereto affix my signature.

FRANCIS G. RAWLING.